US010892572B2

(12) United States Patent
Diessel et al.

(10) Patent No.: US 10,892,572 B2
(45) Date of Patent: Jan. 12, 2021

(54) ASSEMBLY OF A PLUG CONNECTOR PART COMPRISING A HOLDING FRAME AND MODULAR CONTACT INSERTS ABLE TO BE ATTACHED THERETO

(71) Applicant: Phoenix Contact GmbH & Co. KG, Blomberg (DE)

(72) Inventors: Thorsten Diessel, Hiddenhausen (DE); Manuel Tuenker, Doerentrup (DE); Roberto Gilardoni, Paderborn (DE); Dennis Sprenger, Lemgo (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 16/636,911

(22) PCT Filed: Jul. 31, 2018

(86) PCT No.: PCT/EP2018/070721
§ 371 (c)(1),
(2) Date: Feb. 6, 2020

(87) PCT Pub. No.: WO2019/034410
PCT Pub. Date: Feb. 21, 2019

(65) Prior Publication Data

US 2020/0169013 A1 May 28, 2020

(30) Foreign Application Priority Data

Aug. 16, 2017 (BE) .................................. 2017/5565

(51) Int. Cl.
*H01R 9/22* (2006.01)
*H01R 9/26* (2006.01)
(Continued)

(52) U.S. Cl.
CPC ......... *H01R 9/2675* (2013.01); *H01R 13/514* (2013.01); *H01R 13/518* (2013.01); *H01R 31/085* (2013.01)

(58) Field of Classification Search
CPC .. H01R 9/2675; H01R 13/514; H01R 13/518; H01R 31/085
(Continued)

(56) References Cited

U.S. PATENT DOCUMENTS 3,559,813 A * 2/1971 Sosinski ................. H05K 7/02 211/89.01
3,576,520 A * 4/1971 Stauffer .................. H01R 9/26 439/716

(Continued)

FOREIGN PATENT DOCUMENTS

CN 105814748 A 7/2016
DE 202012103360 U1 1/2013

(Continued)

*Primary Examiner* — Abdullah A Riyami
*Assistant Examiner* — Vladimir Imas
(74) *Attorney, Agent, or Firm* — Leydig, Voit & Mayer, Ltd.

(57) ABSTRACT

An assembly of a plug connector part includes: a holding frame having a frame opening for receiving a plurality of modular contact inserts on a plurality of plug-in spaces arranged alongside one another along a width direction; and at least one modular contact insert insertable into the frame opening at at least one plug-in space, an arrangement of plug openings for connecting electrical conductors being disposed on the at least one modular contact insert. The at least one modular contact insert has an arrangement of connection spaces that are assigned to the plug openings and to which at least one functional element is attachable to electrically connect two plug openings to one another.

14 Claims, 6 Drawing Sheets

(51) Int. Cl.

| | |
|---|---|
| ***H01R 13/514*** | (2006.01) |
| ***H01R 13/518*** | (2006.01) |
| ***H01R 31/08*** | (2006.01) |

(58) Field of Classification Search

USPC .......................................................... 439/709

See application file for complete search history.

(56) References Cited

U.S. PATENT DOCUMENTS

| | | | | | |
|---|---|---|---|---|---|
| 4,032,209 | A * | 6/1977 | Rutkowski | H01R 9/26 | 439/355 |
| 4,062,611 | A * | 12/1977 | Carlsson | H01R 13/518 | 439/65 |
| 4,090,764 | A * | 5/1978 | Malsby | H01R 13/514 | 439/471 |
| 4,937,543 | A * | 6/1990 | Ressel | H01H 50/14 | 335/128 |
| 5,312,268 | A * | 5/1994 | Sumida | H01R 13/631 | 439/364 |
| 6,004,162 | A * | 12/1999 | Harting | H01R 13/518 | 439/532 |
| 6,704,815 | B1 * | 3/2004 | Morikawa | H01R 9/2675 | 700/19 |
| 7,316,591 | B2 * | 1/2008 | Ferderer | H01R 13/506 | 439/532 |
| 7,322,842 | B2 * | 1/2008 | Duck | G02B 6/381 | 200/51.03 |
| 8,237,311 | B2 * | 8/2012 | Roth | H01H 71/082 | 307/113 |
| 9,496,692 | B2 * | 11/2016 | Sprenger | H02G 3/22 | |
| 9,577,365 | B1 * | 2/2017 | Herbrechtsmeier | H01R 13/518 | |
| 9,608,374 | B2 * | 3/2017 | Beischer | H01R 13/639 | |
| 10,069,245 | B2 * | 9/2018 | Huhmann | H01R 13/518 | |
| 10,418,773 | B2 * | 9/2019 | Herbrechtsmeier | H01R 13/506 | |
| 10,530,090 | B2 * | 1/2020 | Wolff | H01R 13/506 | |
| 10,665,981 | B2 * | 5/2020 | Mossig | H01R 13/502 | |
| 10,686,278 | B2 * | 6/2020 | Herbrechtsmeier | H01R 13/518 | |
| 10,734,751 | B2 * | 8/2020 | Kropiewnicki | G01R 33/07 | |
| 10,756,475 | B2 * | 8/2020 | Tiemann | H01R 13/6273 | |
| 2003/0194914 | A1 | 10/2003 | Duck et al. | | |
| 2014/0242836 | A1 | 8/2014 | Brand et al. | | |
| 2015/0147907 | A1 | 5/2015 | Brand et al. | | |
| 2016/0072224 | A1 * | 3/2016 | Ichio | H01R 13/506 | 439/345 |
| 2016/0276778 | A1 | 9/2016 | Beischer et al. | | |
| 2018/0248299 | A1 * | 8/2018 | Wolffle | H01R 13/514 | |
| 2018/0254578 | A1 * | 9/2018 | Herbrechtsmeier | H01R 13/5045 | |

FOREIGN PATENT DOCUMENTS

| | | | |
|---|---|---|---|
| DE | 102011112120 | A1 | 3/2013 |
| DE | 102012110907 | A1 | 5/2014 |
| DE | 202015106434 | U1 | 3/2017 |
| EP | 0079016 | A1 | 5/1983 |
| EP | 1336979 | A1 | 8/2003 |
| EP | 1353412 | B1 | 10/2003 |
| WO | WO 2013167253 | A1 | 11/2013 |

* cited by examiner

ASSEMBLY OF A PLUG CONNECTOR PART COMPRISING A HOLDING FRAME AND MODULAR CONTACT INSERTS ABLE TO BE ATTACHED THERETO

CROSS-REFERENCE TO PRIOR APPLICATIONS

This application is a U.S. National Phase application under 35 U.S.C. § 371 of International Application No. PCT/EP2018/070721, filed on Jul. 31, 2018, and claims benefit to Belgian Patent Application No. BE 20175565, filed on Aug. 16, 2017. The International Application was published in German on Feb. 21, 2019 as WO/2019/034410 under PCT Article 21(2).

FIELD

The invention relates to an assembly of a plug connector part.

BACKGROUND

An assembly of this type comprises a holding frame which has a frame opening for receiving a plurality of modular contact inserts at a plurality of plug-in spaces arranged alongside one another along a width direction, and at least one modular contact insert which can be inserted into the frame opening at at least one plug-in space and has an arrangement of plug openings for connecting electrical conductors to the at least one modular contact insert.

Holding frames of this type serve for the modular receiving of contact inserts on plug connectors. One or more contact inserts can be arranged on such a holding frame in order to be inserted together with the holding frame into a housing of a plug connector part and to be connected to the housing. In this way, contact inserts can be combined with each other in a modular manner and arranged in or on a plug connector part via the holding frame.

Such contact inserts can have, for example, one or more electrical contacts. In this case, the contact inserts are connected on the one hand to electrical lines which are supplied to a plug connector and on the other hand form plug contacts through which the plug connector can be brought into engagement with a mating plug connector part in a plug-in manner for electrical contact.

Such modular contact inserts offer the advantage of flexible combinability and thus variable usability of plug connectors.

Plug connector parts with a holding frame receiving modular contact inserts are known, for example, from DE 10 2012 110 907 A1 and DE 20 2012 103 360 U1.

In a holding frame known from DE 10 2012 110 907 A1, it is provided that a second holding frame part can be attached to a first holding frame part, which has recesses for receiving projection elements of contact inserts, in order in this way to block projection elements inserted into the recesses and thus lock them on the holding frame.

In a modular plug connector known from EP 1 353 412 B1, modules can contain, for example, switching means which assume a signal-regulating or signal-controlling function in a module. A plurality of modules can be attached alongside one another to a holding frame.

SUMMARY

In an embodiment, the present invention provides an assembly of a plug connector part, comprising: a holding frame having a frame opening configured to receive a plurality of modular contact inserts on a plurality of plug-in spaces arranged alongside one another along a width direction; and at least one modular contact insert insertable into the frame opening at at least one plug-in space, an arrangement of plug openings for connecting electrical conductors being disposed on the at least one modular contact insert, wherein the at least one modular contact insert has an arrangement of connection spaces that are assigned to the plug openings and to which at least one functional element is attachable to electrically connect two plug openings to one another.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
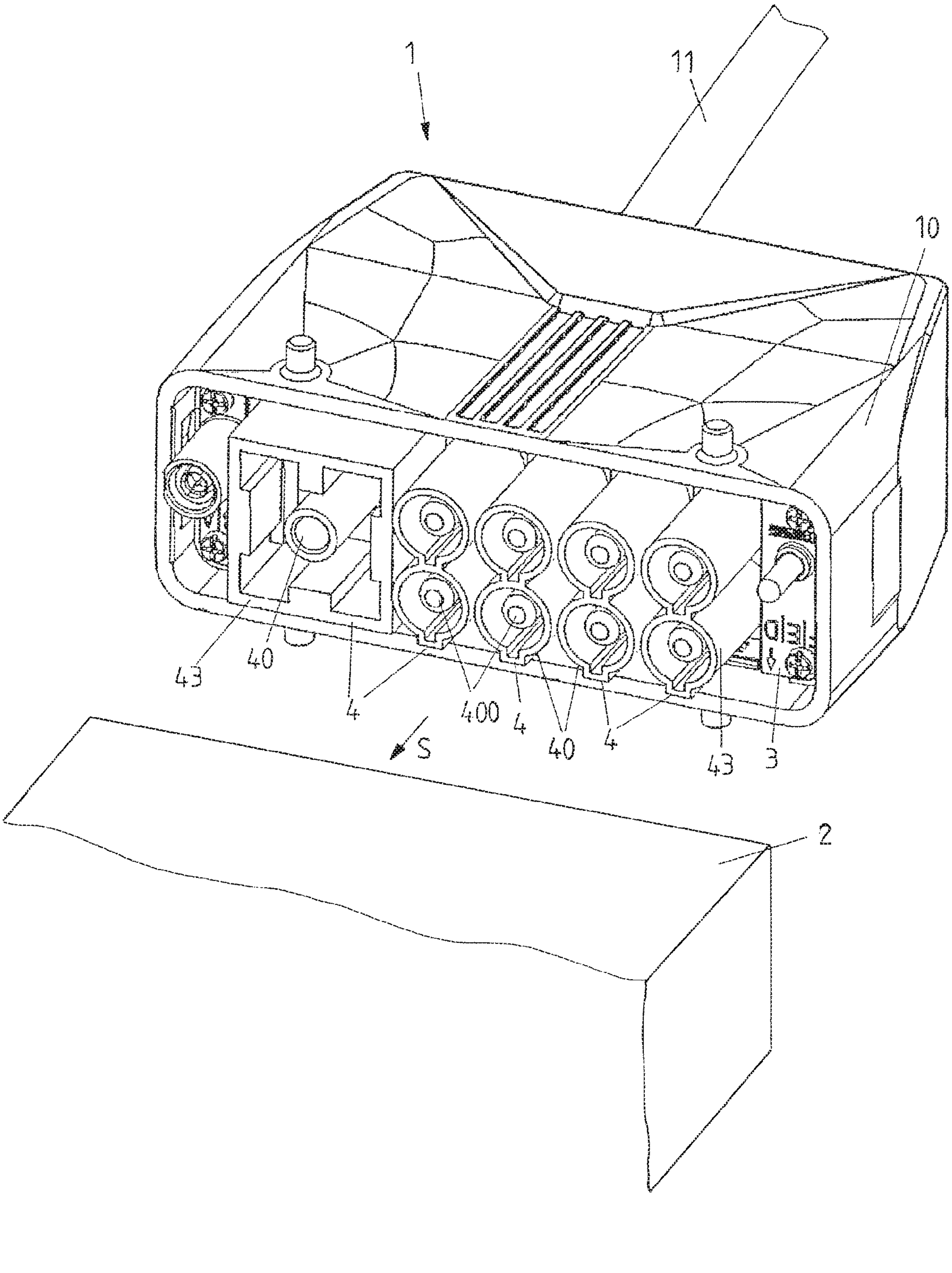
FIG. 1 a view of a plug connector part having a holding frame and contact inserts inserted therein.

In an embodiment, the present invention provides an assembly of a plug connector part which makes it possible to provide further functions on a modular contact insert for modular connection of the contact insert.

Accordingly, the at least one modular contact insert has an arrangement of connection spaces which are assigned to the plug openings and to which at least one functional element can be attached for the electrical connection of two plug openings to one another.

Electrical conductors can be plugged into the plug openings of a modular contact insert in order in this way to electrically connect the electrical conductors to the contact insert. In that connection spaces are assigned to the plug openings and that functional elements, for example for providing a bridge for the purpose of potential distribution, can be connected thereto, plug openings can be variably interconnected. By attaching a functional element for electrically connecting connection spaces, to which different plug openings are assigned, plug openings can be electrically connected to one another, optionally with the provision of an additional electrical function.

The functional elements which can be connected to the connection spaces can be, for example, a contact bridge, a disconnecting blade, an electrical fuse or a diode element. A contact bridge is used to electrically short-circuit connection spaces and thus the plug openings assigned to the connection spaces so that the plug openings assigned to the connection spaces are electrically brought to the same potential. A disconnecting blade serves to switchably connect two plug openings. A disconnecting blade can be opened from a closed position, wherein the plug openings assigned to the connection spaces are electrically connected to one another in the closed position and the plug openings are disconnected from one another in the open position. An electrical fuse serves to connect two plug openings with an interposition of the fuse so that a current flows between the plug openings via the fuse. Plug openings are functionally connected to one another via a diode through a diode element.

In one embodiment, exactly one connection space is assigned to each plug opening. Plug openings can thus be electrically connected to one another via the connection spaces assigned to different plug openings, for example via a contact bridge, via which the connection spaces and, via them, the plug openings assigned to the connection spaces are electrically connected to the same potential (known as potential distribution).

In this case, each connection space can be realized, for example, by an opening in a current bar, into which a contact bridge or another functional element with a terminal pin can be inserted. A functional element may have two or more terminal pins. For example, a contact bridge may be comb-shaped for insertion into a plurality of connection spaces.

In one embodiment, the plug openings for connecting the electrical conductors are arranged alongside one another along one or more rows on a housing body of the modular contact insert. The connection spaces are also advantageously arranged alongside one another along one or more rows, wherein the rows of the connection spaces preferably extend in parallel to the rows of the plug openings. Thus, rows of plug openings for connecting electrical conductors on the one hand and rows of connection spaces for connecting functional elements on the other hand are formed on the modular contact insert.

In one embodiment, the rows can be extended transversely to the width direction along which the plug-in spaces of the holding frame are arranged alongside one another.

In one embodiment, one or more rows of connection spaces form a shaft on a housing body of the contact insert, which is molded, for example, back into the housing body in a recessed manner relative to the rows of plug openings. Such a shaft is formed as a depression on the housing body and preferably serves to receive the functional elements in such a way that at least some functional elements do not protrude outward beyond the housing body in a position inserted into the shaft and are thus at least largely received in the shaft.

In a specific embodiment, the modular contact insert has two rows of plug openings which extend in parallel to one another and to each of which a row of connection spaces is assigned. In this case, the rows of the connection spaces can be located between the rows of the plug openings (as viewed along the width direction). The rows of connection spaces which are assigned to the different rows of plug openings are thus located in a close relative position between the rows of the plug openings, which makes it possible to simply attach functional elements to the rows of connection spaces and, for example, also makes it possible to connect plug openings of different rows to one another via the rows of connection spaces.

The rows of connection spaces together form, for example, a shaft on the housing body of the contact insert, into which functional elements can be inserted.

A plurality of plug-in spaces arranged alongside one another along the width direction are defined on the holding frame. In principle, each plug-in space serves to receive a contact insert so that the division of the plug-in spaces corresponds to the division of the contact inserts in this case. In one embodiment, however, a contact insert, which in particular has a plurality of rows of plug openings and rows of connection spaces assigned to the rows of plug openings, may also have a width which corresponds to twice the width of a plug-in space. When such a contact insert is attached to the holding frame, the contact insert in the inserted position occupies the space of two adjacent plug-in spaces and is accordingly held on the holding frame at two adjacent plug-in spaces.

In principle, it is also conceivable and possible to use a contact insert with an even greater width, for example the width of three plug-in spaces or even more plug-in spaces.

Contact inserts can be modularly combined with one another via the holding frame in order to create a plug face on a plug connector part which can be connected in a plug-in manner to an assigned plug face of a mating plug connector part. For this purpose, one or more contact inserts can each have a plug section on which electrical contact elements are arranged and which can be connected in a plug-in manner to the mating plug connector part.

It is conceivable in this case for all contact inserts to have a plug section with contact elements arranged thereon. However, it is also conceivable and possible for one or more contact inserts not to have a plug section and thus for (merely) an electrical connection—by using suitable functional elements at the connection spaces—of electrical conductors on the contact insert to be able to be provided via the plug openings and connection spaces assigned to the plug openings.

The plug openings for connecting the electrical conductors are formed, for example, on a first side of the housing body of the contact insert, while the plug section is formed on a second side of the housing body facing away from the first side, for example as a plug for plugging into a mating plug connector part or as a socket for receiving a plug of the mating plug connector part. In this case, the connection spaces can be provided either on the first side or on the second side or also on both sides.

In a first embodiment, the connection spaces are arranged on the same side as the plug openings for connecting the electrical conductors. In this case, therefore, electrical conductors and functional elements for connecting the electrical conductors can be connected to the contact insert on the same side. Such an embodiment of the contact insert can be useful, for example, if the plug connector part assigned to the holding frame is to be firmly installed on a switch cabinet and the side of the contact insert assigned to the plug openings and the connection spaces is still accessible even in the assembled state of the plug connector part so that functional elements for connecting plug openings can be attached and also changed.

In a second embodiment, the connection spaces are arranged on the side of the plug section and thus opposite to the plug openings on the contact insert. The functional elements are thus attached to the contact insert from sides of the plug section. This can be useful, for example, if the holding frame is to be inserted into a housing of a plug connector part, for example on an electrical line, and the holding frame is thus received in the housing in the assembled state so that the plug openings in the housing are no longer readily accessible. In this case, a connection with functional elements can take place via the side of the plug section (accessible from the outside), which in particular makes it possible to change the connection in the assembled state of the holding frame.

It is possible for the contact elements of the plug section and the connection spaces as well as the plug openings to have the same division (viewed in the depth direction transversely to the width direction). However, it is also conceivable and possible for the contact elements of the plug section to have, for example, a different division in comparison with the connection spaces. This makes it possible to design the arrangement of the connection spaces in such a way that, for example, standard components, for example standard contact bridges, can be used at the connection spaces.

The holding frame forms a plurality of plug-in spaces offset from each other along the width direction for receiving a plurality of contact inserts. For example, a spring element on a frame wall is assigned to each plug-in space such that contact inserts can be individually inserted into the plug-in spaces and can also be removed from the plug-in spaces again. The holding frame advantageously has a substantially rectangular shape. In this case, frame walls form side faces along the longitudinal sides of the holding frame, on which two spring elements for each plug-in space are arranged opposite to the lock.

In one embodiment, a plug connector part can have a holding frame of the type described above. Inserted into the holding frame can be a plurality of modular contact inserts, at least some of which have a plug section which can be connected to a mating plug connector part in a plug-in direction and has contact elements arranged thereon for contact with the mating plug connector part. Electrical, hydraulic, pneumatic or other contacts, for example, can be provided on the contact inserts. By plugging the plug connector part into engagement with an assigned mating plug connector part, contact is made between the contact inserts held in the holding frame and assigned mating contacts on the part of the mating plug connector part.

FIG. 1 shows a schematic view of an exemplary embodiment of a plug connector part 1 which has a housing 10 and a holding frame 3 inserted into the housing 10. In this exemplary embodiment, an electrical line 11 leads into the housing 10 in which electrical line a plurality of electrical lead wires which end in the housing 10 can be enclosed in order in this way to electrically contact contacts arranged on the holding frame 3.

The plug connector part 1 can be connected in a plug-in manner in a plug-in direction S to an assigned mating plug connector part 2. The holding frame 3 of the plug connector part 1 serves to receive modular contact inserts 4, as illustrated in one exemplary embodiment in FIGS. 2 and 3. The contact inserts 4 are attached to the holding frame 3 and have plug sections 40 projecting to the outside with contact elements 400 arranged thereon which serve for the plug-in connection and electrical contact with assigned mating contact elements of the mating plug connector part 2.

Figure 2:
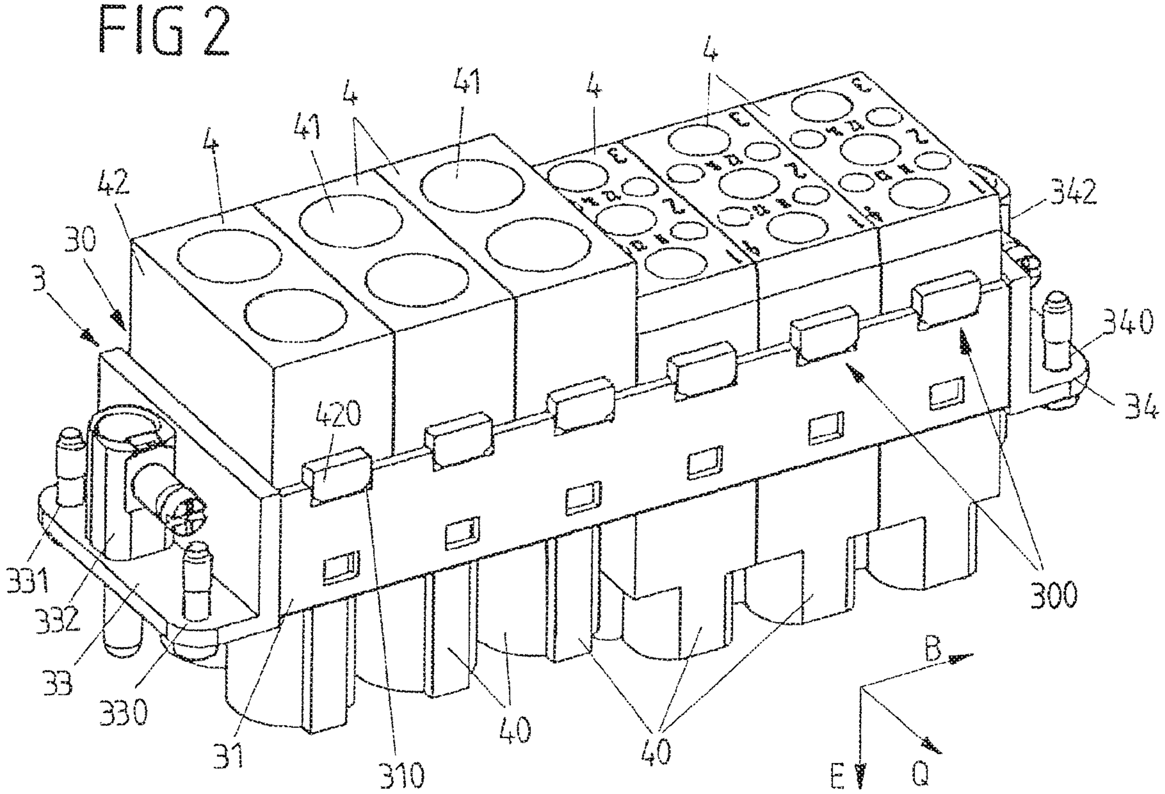
FIG. 2 a view of a holding frame with contact inserts inserted therein.
Figure 3:
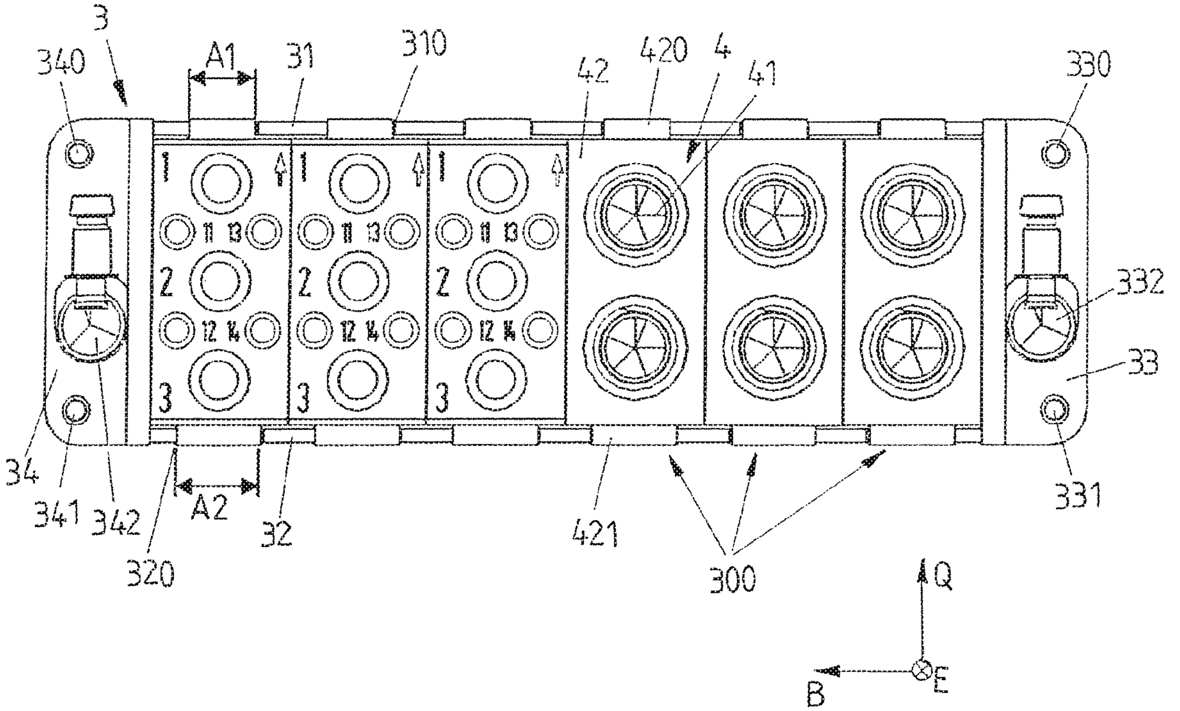
FIG. 3 the arrangement as shown in FIG. 2, seen from above.

As can be seen from FIGS. 2 and 3, the contact inserts 4 are modular and can be of different design. The contact inserts 4 each have a housing body 42 which has, on a side pointing into the housing 10 of the plug connector part 1, plug openings 41 into which lead wires of the line 11 for electrical contact can be inserted. The plug sections 40 with the contact elements 400 arranged thereon project from the housing body 42 on the opposite side facing towards the outside and serve for the plug-in engagement with the mating plug connector part 2.

The contact inserts 4 can differ in the shape of the plug sections 40 with the contact elements 400 arranged thereon, in the number of contact elements 400 or also in their basic function. For example, not only electrical contacts but also mechanical or pneumatic contacts, for example, can be provided via the contact inserts 4.

The contact inserts 4 can be attached to a holding frame 3 in a modular manner in different combinations. The holding frame 3 has, along a width direction B, frame walls 31, 32 which extend in parallel to one another and are spaced apart from one another along a depth direction Q and receive the contact inserts 4 between them. On the front side, the frame walls 31, 32 are connected to one another via wall parts 33, 34 so that a rectangular frame with an opening 30 is formed into which the contact inserts 4 can be inserted in an insertion direction E.

In the exemplary embodiment shown in FIGS. 2 and 3, the contact inserts 4 have an equal dividing dimension, in particular an equal width, along the width direction B. However, this is not mandatory, as also described below.

Recesses 310, 320 are formed in pairs lying opposite one another on the frame walls 31, 32, respectively, into which recesses the contact inserts 4 with projection elements 420, 421 can be inserted so that, in the case of contact inserts 4 arranged in the holding frame 3, the contact inserts 4 each come to lie with their projection elements 420, 421 in a pair of opposite recesses 310, 320.

The recesses 310, 320 of the opposite frame walls 31, 32 have different widths A1, A2 (see FIG. 5) as measured along the width direction B. In this way, a coding is created which allows insertion of a contact insert 4 into a plug-in space 300 created between the frame walls 31, 32 only in a predetermined position and orientation. A first projection element 420, which is narrow as measured along the width direction B, can thus be inserted into the recesses 310 on the first frame wall 31, while a second projection element 421 arranged on the opposite, other side of the housing body 42 can only be inserted into the recess 320 on the second frame wall 32 due to its width A2.

Fastening points 330, 331, 340, 341 are provided on the front wall parts 33, 34 and serve to fasten the holding frame 3 to the housing 10 of the plug connector part 1 and, for example, by means of suitable screw connections, allow the holding frame 3 with contact inserts 4 arranged thereon to be fixed on the housing 10.

Additionally provided on the front wall parts 33, 34 are connecting devices 332, 342 via which, for example, a neutral conductor (known as a PE contact) can be connected to the holding frame 3 and via which, when the plug connector part 1 is connected to the mating plug connector part 2, a ground connection is created between the plug connector part 1 and the mating plug connector part 2.

Figure 4:
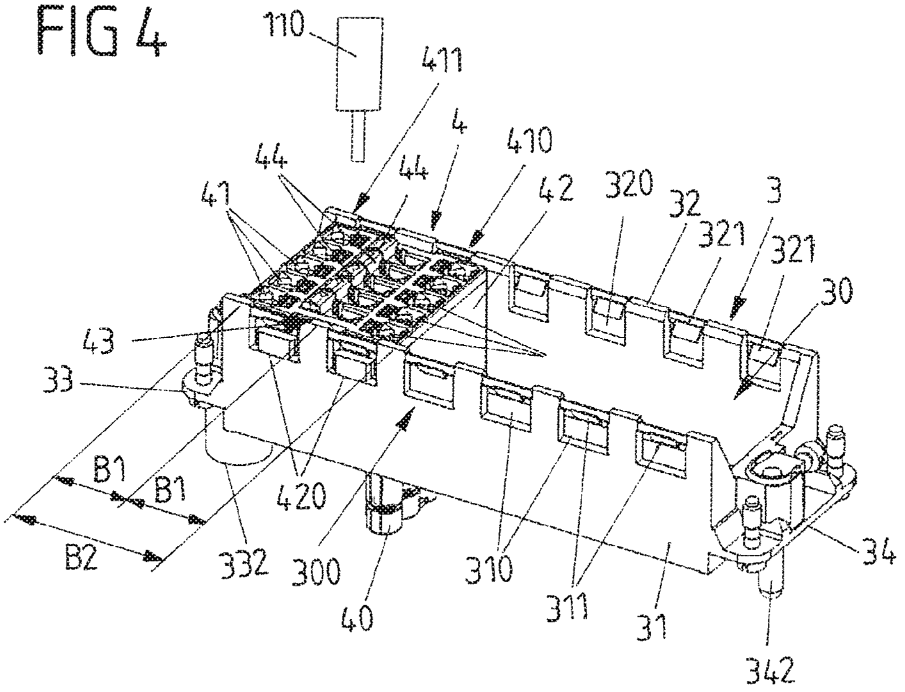
FIG. 4 a view of a holding frame having a contact insert attached thereto, according to one exemplary embodiment.

FIG. 4 shows an exemplary embodiment of a contact insert 4 on a holding frame 3 which has on the one hand two rows 410, 411 of plug openings 41 for plugging in electrical conductors 110 and on the other hand a plug section 40 with contact elements 400 arranged thereon for plug-in connection to an assigned mating plug connector part 2.

As explained above, on the holding frame 3 are created plug-in spaces 300 into which contact inserts 4 can be inserted. In the exemplary embodiment of the contact insert 4 in accordance with FIG. 4, the contact insert 4 has a width B2 which corresponds to twice the width B1 of a plug-in space 300 so that the contact insert 4 occupies the space of two plug-in spaces 300 in the position inserted into the holding frame 3, as can be seen from FIG. 4.

Each plug-in space 300 is defined by two opposite recesses 310, 320 in the side walls 31, 32 of the holding frame 3, wherein, in the exemplary embodiment shown in FIG. 4, a spring element 311, 321 is assigned to each recess 310, 320 via which spring element a latching connection of the contact insert 4 with the holding frame 3 is created in the attached position.

Figure 5:
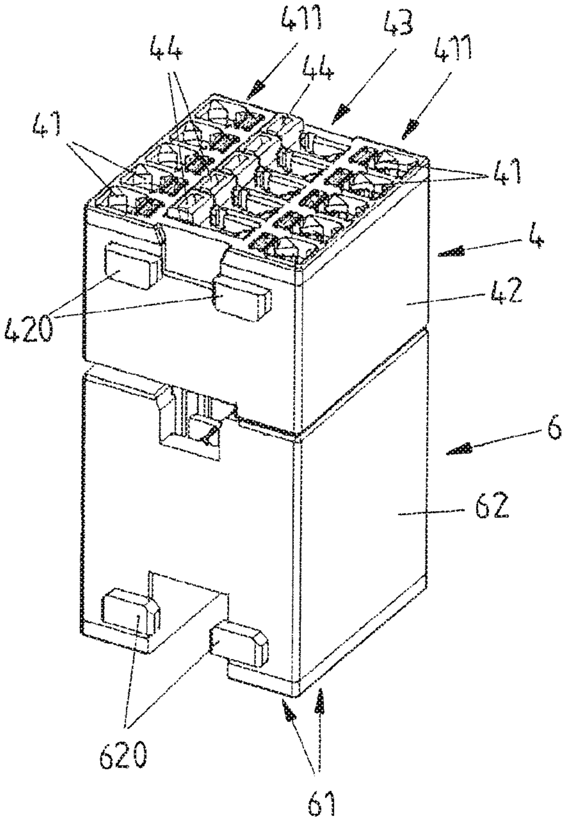
FIG. 5 a view of the contact insert in accordance with FIG. 4 at an assigned contact insert of a mating plug connector part.
Figure 6:
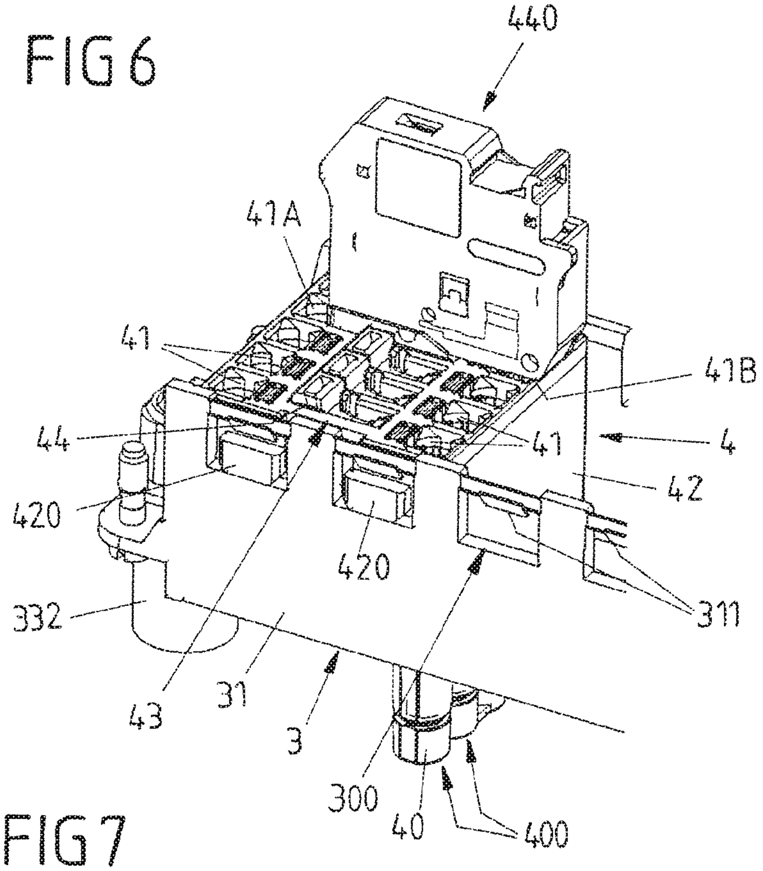
FIG. 6 a view of the contact insert in accordance with FIG. 4 on the holding frame with a fuse element arranged thereon.
Figure 7:
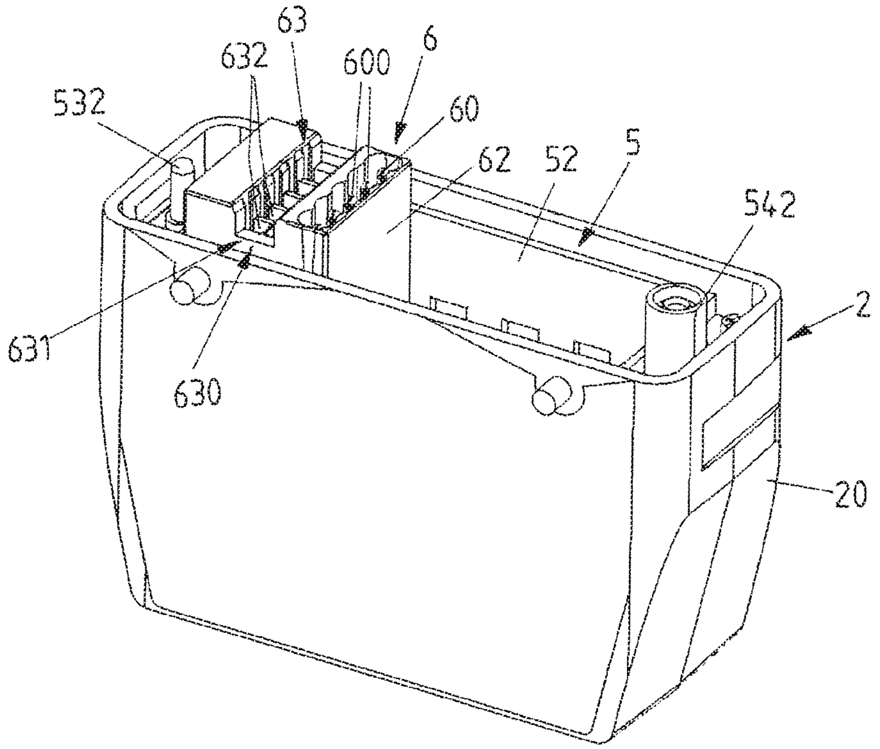
FIG. 7 a view of the contact insert of the mating plug connector part.
Figure 8:
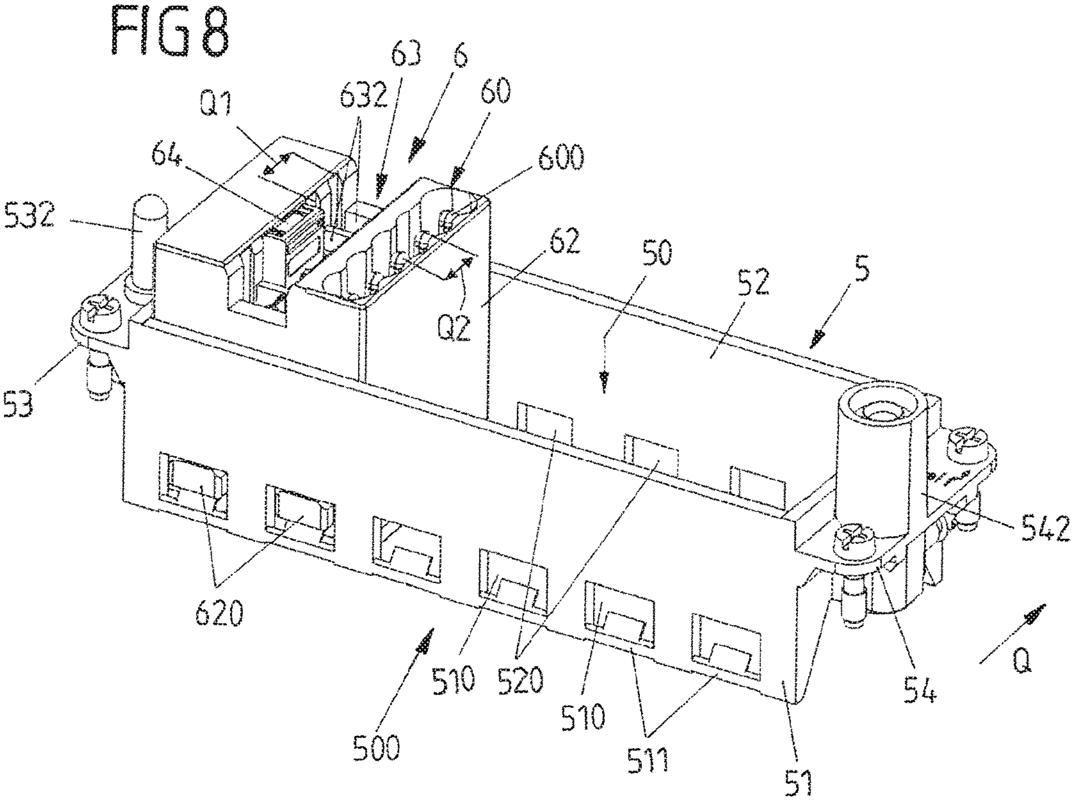
FIG. 8 a view of the contact insert of the mating plug connector part on a holding frame of the mating plug connector part.
Figure 9:
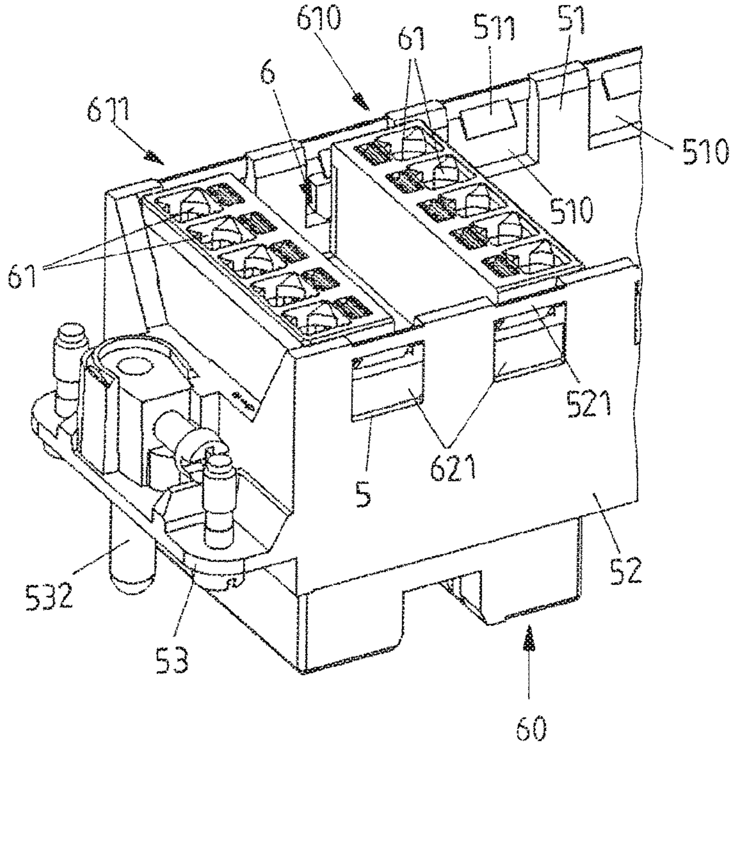
FIG. 9 a view of the contact insert of the mating plug connector part from another side.

FIG. 5 shows the contact insert 4 (without the holding frame 3) in the inserted position together with a contact insert 6 of an assigned mating plug connector part 2. FIG. 6 shows an enlarged view of the contact insert 4 on the holding frame 3. And FIGS. 7 to 9 show the contact insert 6 of the mating plug connector part 2 on an assigned holding frame 5.

Figure 10:
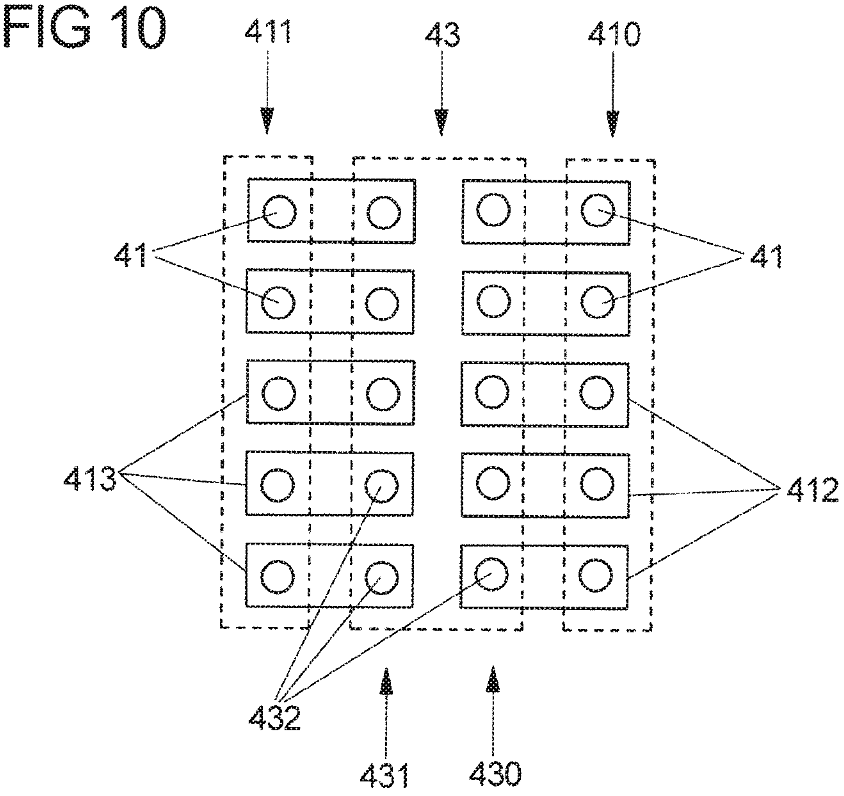
FIG. 10 a schematic view of plug openings and connection spaces on a contact insert.
Figure 11:
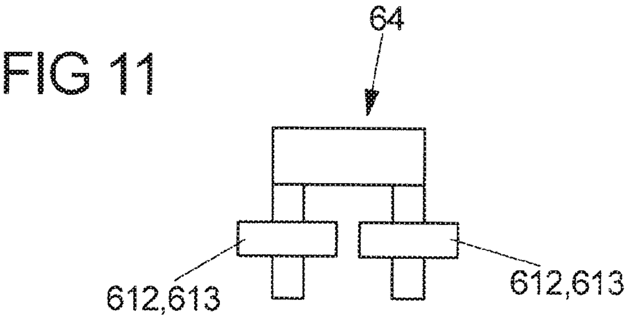
FIG. 11 a schematic view of a contact bridge between two connection spaces of a contact insert.

Between the rows 410, 411 of the plug openings 41, a functional shaft 43 in the form of two rows 430, 431 of connection spaces 432 for attaching functional elements 44, 440, 64 is formed on the housing body 42 of the contact insert 4, as can be seen from FIG. 4 in conjunction with the schematic view in accordance with FIG. 10. In this case, each plug opening 41 of the rows 410, 411 of the plug openings 41 is assigned a connection space 432 which is electrically at the same potential via a current bar 412, 413 with the respectively assigned plug opening 41. The connection spaces 432 allow functional elements 44, 440, 64 to be connected so that the plug openings 41 can thereby be interconnected and electrically functionally connected to one another.

Figure 12:
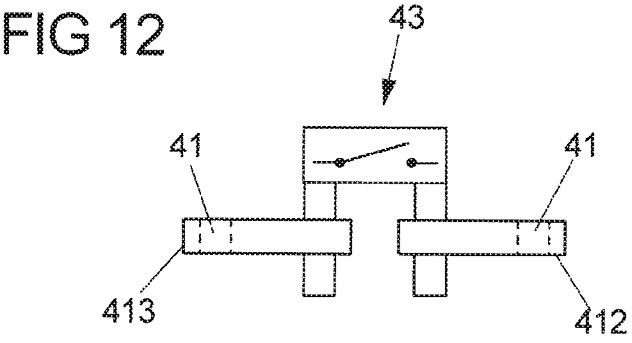
FIG. 12 a schematic view of a disconnecting blade between connection spaces of a contact insert.

In the arrangement shown in FIG. 4, for example, functional elements 44 in the form of what are known as disconnecting blades 44 are inserted into the functional shaft 43. In each case, two connection spaces 432 are connected to each other in a switching manner via the disconnecting blades 44 along the width direction B of opposite plug openings 41, wherein each disconnecting blade 44 can be opened in order to open the electrical connection between the plug openings 41, as schematically illustrated in FIG. 12. The plug openings 41 of the rows 410, 411 are thus switchably connected to one another via the disconnecting blades 44 in that the disconnecting blades 44 are attached to the connection spaces 432 in the form of openings on the current bars 412, 413.

In the arrangement shown in FIG. 6, a disconnecting blade is replaced by a fuse element 440 which connects two opposite plug openings 41A, 41B of the rows 410, 411 of the plug openings 41 to one another via an electrical fuse. The fuse element 440 is formed such that one of the plug openings 41B is covered by the housing of the fuse element 44 so that an electrical conductor 110 can only be connected to the other plug opening 41A. Via the fuse element 44, an electrical connection is established between the plug opening 41A and the plug opening 41B and a contact element 400 of the plug section 40 which is assigned to the plug opening 41B and is electrically connected to the plug opening 41B.

The rows 430, 431 of the connection spaces 432 of the functional shaft 43 extend like the rows 410, 411 of the plug openings 41 along the depth direction Q transversely to the width direction B along which the plug-in spaces 300 are arranged alongside one another. By arranging the rows 430, 431 of the connection spaces 432 of the functional shaft 43 between the rows 410, 411 of the plug openings 41, different functional elements, such as disconnecting blades, diode elements, fuse elements or contact bridges, can be variably placed in the functional shaft 43 for electrically connecting the connection spaces 432 and, via them, the assigned plug openings 41 of the rows 410, 411.

In the case of the contact insert 4 of the holding frame 3, the rows 430, 431 of the connection spaces 432 of the functional shaft 43 are arranged on the same side as the plug openings 41 of the rows 410, 411. The attachment of the functional elements to the functional shaft 43 thus takes place on the same side as the connection of the electrical conductors 110 to the plug openings 41.

In contrast, in the contact insert 6 of the mating plug connector part 2, a functional shaft 63 having two rows 630, 631 of connection spaces 632 is formed in the form of a shaft-shaped depression on the housing body 62 of the contact insert 6 on a side of the contact insert 6 which is assigned to a plug section 60 with contact elements 600 of the contact insert 6 arranged thereon. In this case, the functional shaft 63 is thus formed on the side of the plug section 60, as can be seen from FIGS. 7 and 8.

This makes it possible, as can be seen in particular from FIG. 7, to attach functional elements to the functional shaft 63 in a housing 20 of the mating plug connector part 2 even after installation of the holding frame 5 on which the contact attachment 6 is arranged in order to electrically interconnect plug openings 61 arranged in rows 610, 611 on the other side of the contact insert 6 (see FIG. 9). In this case, each plug opening 61 of the rows 610, 611 of plug openings 61 is electrically assigned to a connection space 632 of the rows 630, 631 of the functional shaft 63 so that connection spaces 632 and, via them, the assigned plug openings 61 can be electrically connected to one another via functional elements, for example via contact bridges 64 as illustrated in FIG. 8 or also via other functional elements, for example in the form of diode elements, fuse elements or disconnecting blades.

As shown by way of example in FIG. 8, the connection spaces 432, 632 of the functional shaft 43, 63 can have a different division Q1 along the depth direction Q in comparison with the division Q2 of the contact elements 400, 600 on the plug section 40, 60. This makes it possible, for example, to design the functional shaft 43, 63 with the connection spaces 432, 632 formed thereon in such a way that standard functional elements having a standard division, for example standard contact bridges, can be used, irrespective of a specific division Q2 of the contact elements 400, 600.

In general, each plug opening 41, 61 is assigned to a connection space 432, 632 of the functional shaft 43, 63 so that each plug opening 41, 61 can be connected to another plug openings 41, 61 via a functional element.

With a view to the arrangement on the respectively assigned holding frame 3, 5, the contact inserts 4, 6 are functionally identical. In particular, the contact insert 6 also has projection elements 620, 621 for being arranged in assigned recesses 510, 520 on side walls 51, 52 of the holding frame 5 with a latching connection via spring elements 511, 521. The contact insert 6 also has twice the width in comparison with a plug-in space 500 and is thus received in the inserted position on two adjacent plug-in spaces 500. Contact devices 532, 542 are formed on front wall parts 53, 54 of the holding frame 5 for electrical contact with assigned contact devices 332, 342 of the holding frame 3 when the plug connector parts 1, 2 are plugged together, in order in this way to provide a common ground potential at the plug connector parts 1, 2.

The connection spaces 432, 632 on the functional shafts 43, 63 can be formed by openings in respectively assigned current bars 412, 413, 612, 613, into which functional elements with terminal pins can be inserted. The connection spaces 432, 632 can, however, also be designed differently, for example with spring elements or the like, to which functional elements can be connected.

The idea underlying the invention is not limited to the exemplary embodiments described above but can also be realized in principle in completely differently designed embodiments.

In particular, the contact inserts shown here are to be understood merely as examples. Contact inserts used on such a holding frame can have, for example, electrical, pneumatic, hydraulic or even entirely different contacts.

The number of plug-in spaces provided on such a holding frame may vary. In this case, it is possible, but not mandatory, for a separate spring element to be assigned to each plug-in space on each frame wall. It is also conceivable and possible for a spring element continuous along the width direction to be assigned jointly to a plurality of plug-in spaces.

Quite different functional elements can be used on functional shafts of contact inserts, in particular also functional elements other than those mentioned here.

A contact insert of the type described here does not necessarily have to have a plug section with contact elements arranged thereon for plug-in connection to another contact insert of a mating plug connector part. It is also conceivable and possible for a contact insert to have (only) plug openings and connection spaces of a functional shaft so that conductors can be electrically interconnected via the contact insert.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector part
10 Housing
11 Line
110 Conductor
2 Mating plug connector part
20 Housing
3 Holding frame
20 Opening
300 Plug-in space
31, 32 Frame wall
310, 320 Recess
311, 321 Spring element
33, 34 Wall part
330, 331, 340, 341 Fastening points
332, 342 Contact device
4 Modular contact inserts
40 Plug section (plug face)
400 Contact elements
41, 41A, 41B Plug openings
410, 411 Rows
412, 413 Current bar
42 Housing body
420, 421 Projection element
43 Functional shaft
430, 431 Rows
432 Connection spaces (plug openings)
44 Functional element (disconnecting blade)
440 Functional element (fuse)
5 Holding frame
50 Opening
500 Plug-in space
51, 52 Frame wall
510, 520 Recess
511, 521 Spring element
53, 54 Wall part
532, 542 Contact device
6 Modular contact inserts
60 Plug section (plug face)
600 Contact elements
61 Plug openings
610, 611 Rows
612, 613 Current bar
62 Housing body
620, 621 Projection element
64 Functional shaft
630, 631 Rows
632 Connection spaces (plug openings)
64 Functional element (contact bridge)
A1, A2 Width
B Width direction
B1, B2 Width
E Insertion direction
S Plug-in direction
Q Depth direction
Q1, Q2 Division

The invention claimed is:

1. An assembly of a plug connector part, comprising:

a holding frame having a frame opening configured to receive a plurality of modular contact inserts on a plurality of plug-in spaces arranged alongside one another along a width direction; and at least one modular contact insert insertable into the frame opening at at least one plug-in space, an arrangement of plug openings for connecting electrical conductors being disposed on the at least one modular contact insert, wherein the at least one modular contact insert has an arrangement of connection spaces that are assigned to the plug openings and to which at least one functional element is attachable to electrically connect two plug openings to one another.

2. The assembly according to claim 1, wherein exactly one connection space is assigned to each plug opening.

3. The assembly according to claim 1, wherein the plug openings are arranged alongside one another along at least one first row and the connection spaces are arranged alongside one another along at least one second row extending in parallel to the at least one first row.

4. The assembly according to claim 3, wherein the at least one modular contact insert has a housing body on which the at least one first row of plug openings and the at least one second row of connection spaces is arranged, and wherein the at least one second row of connection spaces is set back from the at least one first row of plug openings on the housing body.

5. The assembly according to claim 3, wherein the at least one first row of plug openings extends along a depth direction extending transversely to the width direction.

6. The assembly according to claim 1, wherein the at least one modular contact insert has two first rows of plug openings extending in parallel to one another, and wherein a second row of connection spaces is assigned to each first row of plug openings.

7. The assembly according to claim 6, wherein the second rows of connection spaces, as viewed along the width direction, are arranged between the first rows of the plug openings.

8. The assembly according to claim 1, wherein each plug-in space has a first width and the at least one modular contact insert has a second width which is twice as large as the first width, and wherein at least one modular contact insert is insertable into two adjacent plug-in spaces.

9. The assembly according to claim 1, wherein the at least one contact insert has a plug section for plug-in connection to a mating plug connector part and at least one contact element arranged on the plug section.

10. The assembly according to claim 9, wherein the plug section is arranged on a side of the at least one modular contact insert facing away from the arrangement of plug openings.

11. The assembly according to claim 9, wherein the arrangement of connection spaces is arranged on a same side of the at least one modular contact insert as the arrangement of plug openings or as the plug section.

12. The assembly according to claim 9, wherein contact elements arranged on the plug section have a different division than the arrangement of the connection spaces.

13. The assembly according to claim 1, wherein the at least one functional element comprises a contact bridge, a disconnecting blade, an electrical fuse, or a diode element.

14. A plug connector part, comprising:

the assembly according to claim 1, wherein the plug connector part has a housing to which the holding frame is fastened.

* * * * *